(12) United States Patent
Müller

(10) Patent No.: US 7,080,855 B2
(45) Date of Patent: Jul. 25, 2006

(54) SAFETY STEERING COLUMN, MOTOR VEHICLE WITH A SAFETY SYSTEM AND SAFETY METHOD

(75) Inventor: Olaf Müller, Rüsselsheim (DE)

(73) Assignee: Thyssenkrupp Presta AG, Eschen (LI)

( * ) Notice: Subject to any disclaimer, the term of this patent is extended or adjusted under 35 U.S.C. 154(b) by 312 days.

(21) Appl. No.: 10/459,413

(22) Filed: Jun. 10, 2003

(65) Prior Publication Data

US 2003/0227159 A1    Dec. 11, 2003

Related U.S. Application Data

(63) Continuation-in-part of application No. 09/700,274, filed on Jan. 25, 2001, now abandoned.

(51) Int. Cl.
*B62D 1/19* (2006.01)

(52) U.S. Cl. .......................................... 280/777; 74/493

(58) Field of Classification Search ............... 280/777, 280/775; 74/493; 251/129.15; 137/487.5; B62D 1/19
See application file for complete search history.

(56) References Cited

U.S. PATENT DOCUMENTS 5,524,927 A * 6/1996 Toussaint .................... 280/777
6,182,942 B1 * 2/2001 Kadlicko .................. 251/129.1
6,189,919 B1 * 2/2001 Sinnhuber et al. ........... 280/731
6,478,333 B1 * 11/2002 Barton et al. ................ 280/777
6,575,497 B1 * 6/2003 McCarthy et al. ........... 280/777
6,877,775 B1 * 4/2005 Manwaring et al. ......... 280/777

FOREIGN PATENT DOCUMENTS

| DE | 22 46 844 | 3/1978 |
| DE | 3809442 A1 | 10/1989 |
| DE | 38 05 869 A1 | 11/1989 |
| DE | 295 14 314 U1 | 12/1995 |
| DE | 198 29 239 A1 | 1/1999 |
| WO | WO 96/16841 | 6/1996 |

* cited by examiner

*Primary Examiner*—Eric Culbreth
(74) *Attorney, Agent, or Firm*—Martin Fleit; Paul D. Bianco; Fleit Kain Gibbons Gutman Bongini & Bianco P. L.

(57) ABSTRACT

A safety steering column which is adjustable in its axial direction whereby pyrotechnically driven steering column retraction is provided for a positioning of a safety steering column in its axial direction, to move it away from the driver in case of an accident. Furthermore, a safety system incorporating such a safety steering column and a motor vehicle so equipped that can distinguish between different drivers regarding weight, size and belted condition; the system providing alternative safety measures depending on the driver's needs for protection.

7 Claims, 7 Drawing Sheets

SAFETY STEERING COLUMN, MOTOR VEHICLE WITH A SAFETY SYSTEM AND SAFETY METHOD

RELATED APPLICATION

This application is a continuation-in-part of application Ser. No. 09/700,274 filed Jan. 25, 2001, now abandoned, the contents of which are here incorporated by reference in their entirety.

BACKGROUND OF THE INVENTION

1. Field of Invention

The invention relates to a safety steering column, a motor vehicle with a safety system and a safety method.

2. Prior Art

In practice, safety steering columns are known which in case of a front impact or crash of a motor vehicle equipped with a known safety steering column, a movement of the steering wheel away from the driver will be generated. In these constructions mere mechanical systems are involved which use only the kinetic energy of the motor vehicle for steering column positioning. In dependence on the specific situation of an accident, a desired function and a protection of the driver are not reliably guaranteed.

SUMMARY OF THE PRESENT INVENTION

The object of the invention is provide for an increase in the passengers' safety in the event of such an accident. According to the present invention, this is accomplished by the provision of a novel safety steering column that includes a pyrotechnically driven steering column retraction means, triggerable in dependence on an accident condition. Thereby the steering wheel can be reliably moved away from the driver whereby his risk of injury by an impact on the steering wheel is significantly reduced.

Preferably, the steering column retraction means are constructed in such a way that upon triggering, at first a steering column axial positioning is released. This is performable especially by a novel pyrotechnic operational means. Then, the retraction of the steering column is generated along its axial positioning distance.

Preferably, the steering column retraction means are coupled to operation means for an airbag and, in particular, an airbag with multi-stage triggering so that the same pyrotechnic operation means existing for the inflation of the airbag can be at least partly used for driving the steering column retraction means, and especially, for the retraction of the steering column along its axial positioning distance.

Furthermore, in a refinement of the present invention, the inflating and unfolding of the airbag, and especially, the multi-stage inflating and unfolding of the airbag is controlled in dependence on the retraction distance and/or the retraction position of the steering column. This effect may be performed, for example, by means of a mechanical control mechanically generating further triggering of the pyrotechnic operation means for the steering column retraction means and/or the airbag in dependence on the retraction distance and/or retraction position of the steering column and/or the inflation/unfolding condition.

By means of such a safety steering column, the safety of a driver of a motor vehicle is additionally optimized.

The safety system, as well as, a motor vehicle incorporating such safety system according to the invention is characterized by a safety steering column with pyrotechnically operated steering column retraction means which can be triggered in dependence on an accident condition.

Preferably, such a safety system or motor vehicle includes means for the detection of the driver's sitting position, and means which control the operation of the steering column retraction means in dependence on the driver's sitting position. Resulting from or instead of or in addition to the sitting position, the driver's size, weight and/or constitution can be retrieved and considered for the control of the operation of the steering column retraction means.

In a safety method according to the invention, steering column retraction means are pyrotechnically operated in dependence on an accident situation in such a way that the steering wheel is moved away from the driver.

In refinement of the method, the driver's sitting position and/or his size, weight and/or constitution are detected and transmitted to a control by means of which in dependence on these dimensions the operation of the steering column retraction means is controlled.

In the following, basic principles of the invention, as well as, preferred and favorable embodiments thereof are listed.

1. Safety steering column which is adjustable in its axial direction characterized in that pyrotechnically driven steering column retraction means are provided by means of which a positioning of the safety steering column in its axial direction away from the passenger can be operated in case of an accident.

2. Safety steering column further developed in that the pyrotechnically driven steering column retraction means include at least one pyrotechnically driven cylinder for the positioning of the safety steering column in its axial direction.

3. Safety steering column further developed in that it is provided with a pyrotechnically driven cylinder in such a way that the latter can rotate the lock axis of the comfort positioning by means of a gear rod controlled into engagement with a gear wheel by cams in order to open the positioning lock.

4. Safety steering column further developed in that it is provided with a pyrotechnically driven cylinder in such a way that it can rotate a lock axis of the comfort positioning by means of a swivel lever in order to open the positioning lock.

5. Safety steering column further developed in that the steering column retraction means can be controlled, especially, switched on and off in dependence on the driver's data.

6. Safety steering column further developed in that a pyrotechnic cylinder is included which is mounted in such a way that it slides in a slot guide in an accident-free normal condition in the case of a steering comfort positioning.

7. Safety steering column further developed in that a comfort positioning with a positioning mechanism is provided, and that a piston rod of the positioning mechanism built as gear rod, engages a positioning gear wheel in each position of the comfort positioning after at least an approximately equally short stroke.

8. Safety steering column further developed in that a pyrotechnic positioning cylinder is included which is mounted on a guide movable in such a way that it is moved together with the comfort positioning in an initial position.

9. Safety steering column further developed in that a pyrotechnic positioning cylinder is included which is mounted in its slot guide in such a way that in case of the triggering of the steering column retraction means a keying of two wedges connected by shear off pins is wedged in such a way that one wedge is keyed against the other one by driving the cylinder, and thereby the cylinder is fixed.

10. Safety steering column further developed in that a pyrotechnical cylinder is provided which is mounted in a slot guide in such a way that two wedge-shaped drivers key against each other by moving one wedge by the cylinder in one direction and the other one by means of a tear-off driver in the opposite direction together with the piston rod of the piston.

11. Safety steering column further developed in that a pyrotechnic cylinder is provided which is built in such a way so that thereby apart from the opening, a positioning mechanism of the safety column thereafter a carriage to mount the safety steering column can be moved away from the driver.

12. Safety steering column further developed in that a pyrotechnic cylinder is provided which is guided in such a way that it is moved beyond the comfort positioning distance in a comfort positioning carriage guide.

13. Safety steering column further developed in that a pyrotechnic cylinder is provided that is guided in such a way that the cylinder locks at the end of its stroke.

14. Safety steering column further developed in that a pyrotechnic cylinder is provided which is provided with a lock piston so that the lock piston can only be moved forwards and locks in case of a load in the opposite direction.

15. Safety steering column further developed in that a pyrotechnic cylinder includes a piston which can be locked by means of locking balls or a load absorber.

16. Safety steering column further developed in that a pyrotechnic cylinder is provided wherein on the side of the cylinder, opposite to the force side, a damping, especially a hydraulic or air damping, is mounted in such a way that a speed regulation can be effected by the discharging of the media.

17. Safety steering column further developed in that a pyrotechnic cylinder is provided which can be ignited in such a way that a timing with the triggering of the airbag is performed.

18. Safety steering column further developed in that a steering column mounting carriage and a load sheet are provided such that the load sheet is bent away from the carriage after being unlocked and releases the longitudinal movement of the carriage.

19. Safety steering column further developed in that a steering column mounting carriage, electronically controlled, absorbs peak loads, with a load absorbing sheet in case of tall people, and at the same time, is used to bring pyrotechnically, especially electronically controlled, the safety steering column to a farther distance to small people sitting close to the air bag.

20. Safety steering column which is adjustable in its axial direction and includes steering column retraction means further developed in that the steering column retraction means are constructed in such a way that through its triggering it, at first, releases an axial positioning of the steering column, and then, generates the retraction of the steering column along an axial positioning line away from a driver or passenger.

21. Safety steering column further developed in that pyrotechnic operation means are provided for the release of an axial positioning and/or for the axial positioning of the steering column along are axial positioning direction away from a passenger.

22. Safety system further developed in that the safety steering column is fixed by a load absorbing sheet to the carriage in such a way that the fixing of the load absorbing sheet can be cut in case of an accident.

23. Safety system further developed in that pyrotechnic operation means of an airbag device are provided, which are included in the pyrotechnically operated steering column retraction means or coupled therewith.

24. Safety system further developed in that operation means are provided for an airbag device and especially for a multi-stage triggered airbag, by means of which the steering column retraction means are coupled for operation purposes so that the same pyrotechnic operation means existing for the inflation of the airbag can be at least partly used for the release of the positioning and/or the positioning drive of the steering column retraction means.

25. Safety system further developed in that the inflation and unfolding of the airbag and especially, given the case, the multi-stage inflation, and unfolding of the airbag, in dependence on the retraction distance and/or the retraction position of the steering column, can be controlled or vice versa.

26. Safety system further developed in that an inflation and unfolding of the airbag especially, given the case, the multi-stage inflation and unfolding of the airbag, and/or a retraction of the steering column can be controlled depending on the passengers' data.

27. Safety system further developed in that a preferably mechanic control is provided which generates the subsequent triggerings of the pyrotechnic operation means for the steering column retraction means and/or the airbag, especially mechanically, in dependence on the retraction distance and/or retraction position of the steering column and/or on the inflation/unfolding condition of the airbag.

28. Motor vehicle characterized by a safety steering column and/or a safety system as described above.

29. Safety method for the triggering and operation of a safety steering column and/or a safety system according to the above characterized in that at first, by means of an ignition of one single or first propellant charge, a lock or stop of the safety steering column in its axial direction is released or canceled, and that then the safety steering column is treated by the effect of the propellant charge, the first propellant charge or, given the case, a further second propellant charge in the direction of its maximum retracted position away from the driver.

30. Safety method characterized that the further propellant charge is a second propellant charge which is ignited by the effect of the ignited first propellant charge.

31. Safety method characterized that the further propellant charge is a second propellant charge by means of which an airbag is inflated after its ignition simultaneously with or time delayed to the steering column retraction.

32. Safety method in a motor vehicle wherein a steering column is moved away from the driver in case of an accident, especially in case of the triggering of a steering wheel airbag, characterized in that the driver's sitting position is sensed, before a steering column movement away from the driver caused by an accident and then in dependence on the sitting position, if the latter goes beyond a given or predetermined distance to the steering wheel, and/or other passengers' data before or during a deployment of the airbag, the steering column is moved, away from the driver by separate operation means, such as, for example, pyrotechnic power storage.

Additional favorable and preferred configurations of the invention will be apparent to one skilled in the art from the following detailed description of preferred embodiments of the invention taken with the appended drawings in which specific preferred embodiments are illustrated.

DETAILED DESCRIPTION OF PREFERRED EMBODIMENTS OF THE INVENTION

In the individual figures of the drawings, the same or similar parts or parts with the same or similar function have been provided with the same reference symbols or are illustrated comparably so that parts and their combinations, functions and modes of operation will be readily evident to an ordinary person skilled in the art, from viewing the figures and illustrations individually, comparison thereof and/or the following descriptive information, also without additional information, even when no explicit references between individual figures and/or between figures and text are stated or presented.

In the following, based on the figures, the invention will be explained in greater detail mentioning in addition some especially favorable features and effects of the corresponding embodiments.

Figures 1A, 1B:
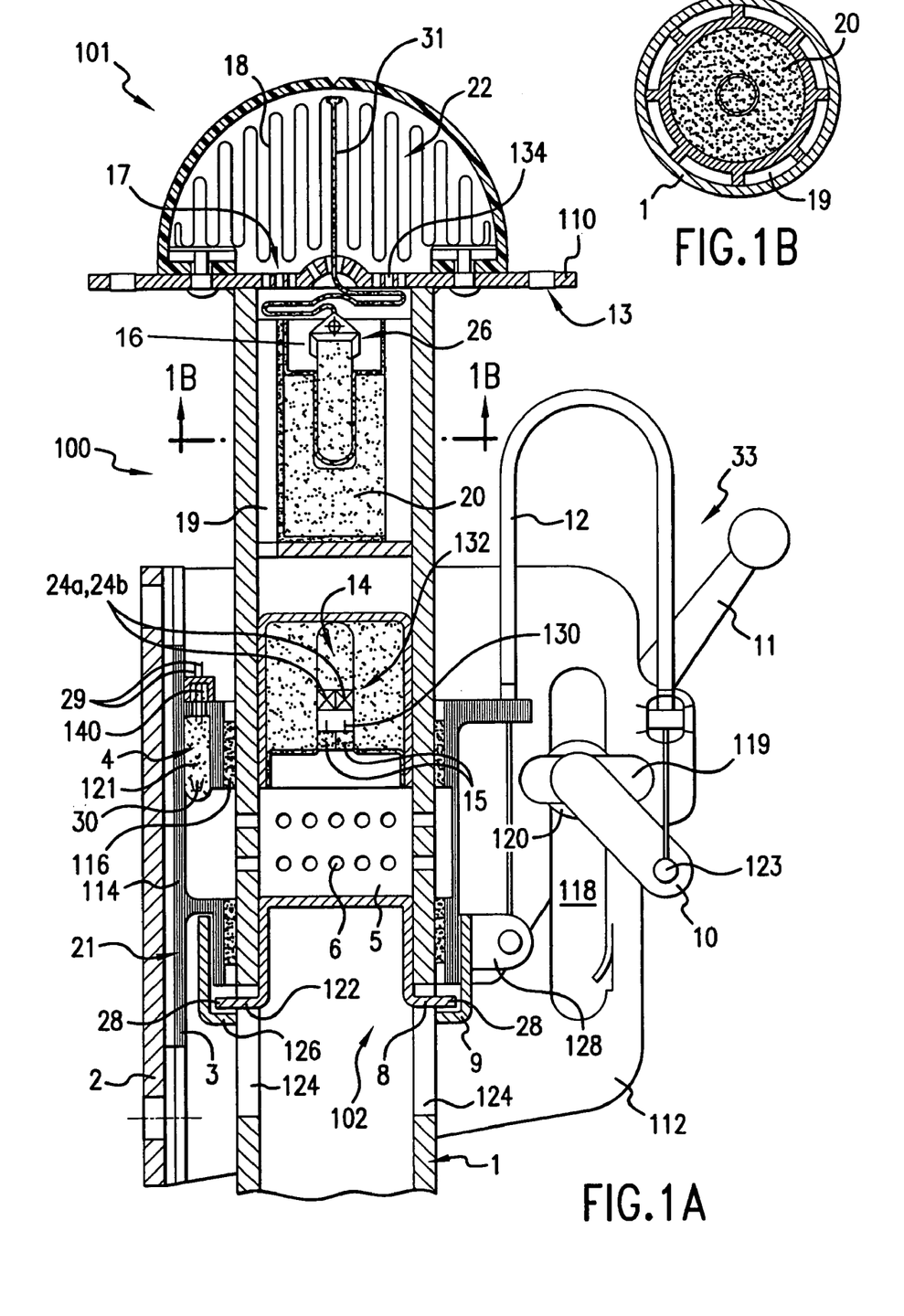
FIGS. 1A and 1B show in longitudinal cross section and schematically an embodiment of a safety steering column with the inventive steering column retraction means and a driver airbag mounted on the steering wheel at the head of the steering column.

Referring now to the figures of the drawing, FIG. 1A and 1B show a first embodiment of the safety steering column of the invention. As shown, a safety steering column 100 with safety means or a safety system 101 in the form of steering column retraction means 102 and a driver airbag 22 which is two-staged, is shown in FIG. 1A and 1B. The steering column 1 is angularly mounted in a motor vehicle in conventional fashion. As shown in FIG. 1A, the lower end of steering column 1 is directed toward the floor of the vehicle and angled to the front, while a steering wheel, not shown, is mounted to plate 110 fixed to the top of the steering column via bolt openings 13. The steering column 1 is rotatably mounted in and carried by the central cylindrical section 114 of a positioning carriage 3, which in turn, is slidably mounted on a mounting plate 2 that is fixed to the motor vehicle frame, directly or indirectly. The steering column 1 moves axially with the carriage 3, but can rotate relative to the carriage 3 via bearing pads 116. A plate 112 integrally formed with the section 114 of carriage 3 extends behind the column 1, as shown in FIG. 1A, and to the right of column 1, as shown in FIG. 1A. The plate defines a vertical slot 118 in which rides a pin 120 that is journaled in the vehicle fixed structure. A lever 11 is connected to the pin for rotating it from a locked position to an unlocked position whereupon the column 1 and the carriage 3 can be moved vertically up or down for comfort positioning. This is a conventional arrangement.

Mounted in a recess formed in the carriage 3 is primary ignition system 4 consisting of a cap or cartridge 30 containing a gas generating material that can be ignited electrically via an igniter 140 that is driven by the electrical connections 29. When an accident happens, a switch element response to the event sends electricity to connections 29 causing the igniter 140 to be ignited whereby the gas generating material 121 is ignited to generate gas. This construction is conventional; however, the placement of the primary ignition system 4 outside the steering column 1 and/or putting the cartridge 30 in the recess in the carriage 3 are novel features. The gas generated passes through holes 6 in the steering column 1 and into a pressure chamber 5 where it exerts pressure on inverted switching sleeve 8 that opens downward and has an intermittent flange 122 comprised of arcuate sections that project through complementary slots 124 in steering column 1. In repose, the flange 122, which consists of a series of arcuate sections projecting through slots 124 in steering column 1, is at the top of the slots 124. Flange 122 coacts with an inward flange 126 formed in the bottom of annular adjustment sleeve 9, that is, they overlap vertically. Thus, when gas is generated and applies pressure against the inverted sleeve 8, sleeve 8 is forced down and flange 122 contacts flange 126 driving the annular adjustment sleeve 9 downwardly. Sleeve 9 has fixed to it a lug 128. One end of a Bowden cable 12 is anchored in lug 128; the other end of Bowden cable 12 is attached to one end of a link 10 via a crank 123: The other end of link 10 is coupled to the pin 120. The Bowden cable is supported and guided by both the section 114 and the plate 112. When sleeve 9 is driven downwardly, it carries lug 128 downward, and the Bowden cable 12 forces the link 10 to pivot and to drive the pin 120 to its unlocked position, thereby releasing the pin 120 in the slot 118. The steering column 1 is now free to move vertically up and down. Gas pressure causing the airbag to inflate will produce a reaction that will force the freed column 1 downwardly away from the driver; the so-called path of least resistance.

The steering column retraction means 102 of the safety means 101 comprises a first stage 14 gas generation for the airbag 22 and a reversing mechanism 21 of the steering column 1 partly shown in FIG. 1A.

The steering column 1 is axially adjustably arranged, in the embodiment according to FIGS. 1A, and 1B, by means of positioning carriage 3 slidably mounted on a mounting plate 2. The positioning carriage 3 carries the primary ignition 4 in a recess, which when gas is generated is in communication with a pressure chamber 5 via pressure through holes 6. A restriction of the pressure chamber 5 is provided with switching sleeve 8 and is axially adjustable wherein the switching sleeve 8 sticks out arcuate segments of an intermittent flange 122 that project out of the steering column 1 through slots 124 (only two slots are marked) in the steering column 1. The free ends 28 of the switching sleeve 8 abut for engagement or locking with a movement along the slots 124 against flange 126 of the adjustment sleeve 9 onto which one end of a Bowden cable 12 is mounted via lug 128. The other end of the Bowden cable 12 is mounted on a release lever 10 which operates together with a manual positioning lever 11.

Furthermore, the steering column retraction means 102 of the first embodiment of the FIGS. 1A and 1B consists of a first stage gas generation 14 including an ignition for generating gas to inflate the driver airbag 22 and of a secondary stage gas generation 20 including a pressure fuse 26. The ignition of the first stage 14 of the driver airbag 22 has two pistons 15, each having an igniter pin 130, which can be driven by the gas pressure in the pressure chamber 5 into igniters 24a, 24b to cause the gas generation material 132 to ignite and generate gas. The gas so generated passes around the annular space 19 surrounding the second stage 20 and passes into the airbag though holes 134 in plate 110. The driver airbag 22 of this embodiment comprises furthermore, that the second stage 20 includes a cord fuse 16 operatively connected with cord 31. A particle filter 17 is mounted before the initial bag 18 of the driver airbag 22. From the first stage 14, an annular gas passage 19 (also see FIG. 1B) runs along the second stage 20 into the bag 22. For the sake of completeness, screw or bolt holes 13 enable the driver's steering wheel to be mounted to plate 110.

In the FIG. 1A, the primary gas generator 4 is ignited by electrically triggering connector cables 29 as clearly illustrated. The pressure stroke generated by the corresponding cap or cartridge 30 (gas generation) fulfills two functions, in particular. On the one hand, this pressure stroke causes the two firing pins 130 of the two pistons 15 to trigger mechanically the ignition of the first stage 14 (see FIG. 1A) which can partly inflate the airbag 18 by means of the annular gas passage 19 (also see FIG. 1B) exterior of the second stage 20 indicated together with the cord fuse 26. An important fact is that the cartridge 30, which can be electrically triggered or ignited, is arranged stationary in the motor vehicle outside the rotatable steering column 1, and the rotatable steering wheel (not shown) thereby avoiding, in a favorable way, the necessity for any electrical connection between the rotatable steering column or steering wheel (not shown) and an airbag triggering control (not shown) tightly installed in the motor vehicle (not shown).

In the prior art, one possible verification of such an electronic connection that used to be compulsory is a so-called coil spring, for example, made of plastics, through which the connecting cables to an electrically triggerable cartridge in the rotatable steering wheel are passed and which makes sure that this electric cartridge can be triggered in each rotation position of the steering wheel. Such a coil spring, however, has a relatively high price. The present invention does not use such an expensive coil spring, but rather offers a more elegant solution by utilizing the comparatively cheaper combination of an electric primary ignition 4 mounted stationary in the vehicle relative to the steering column 1, and a mechanically triggered first ignition stage 14 that can be rotated together with the steering column and the steering wheel.

For the sake of completeness mention should be made of the fact that the cord fuse 16 will only then be triggered if the airbag 18 can unhinderedly extend over a given point (beyond a certain preselected degree of inflation) and therefore, pulls so much on the cord 31 that thereby a known tearing action fuse (fuse 26) is activated or a provided double tearing action results. It is duly noted that the construction of the two gas generation stages and mode of ignition are known in principle and would be known to persons skilled in the art; what is unique is the selection of the type of gas generation and where it is placed in the system. Fuse 26 for an increased triggering safety may be triggered by other kinds of ignition, for example, impact action fuses can also be used and triggered by appropriate means. Such constructions are known in the art.

On the other hand, the key point is the mounting the primary ignition system 4 outside the steering column in a stationary position relative to the steering column 1. If the primary ignition system 4 is too small for such a performance, maybe due to financial reasons, the function of the primary ignition system 4 becomes only to fire off the first ignition stage 14 of the airbag device 22, and the gas generated from the first ignition stage 14 is used for the corresponding positioning of the switching sleeve 8, to unlock the steering column 1 to enable up and down movement, which is especially preferred, and the function of partial inflation of the airbag 22. As another alternative a combination of both pressures may also be used.

The switching sleeve 8 is coupled to or engages the adjustment sleeve 9, which is non-rotatable or resting with respect to the rotation of the steering column 1, in the carriage 3 providing steering column support. Thereby, in a simple and clever way, the pressure stroke of the primary ignition system 4 passed into the rotatable steering column 1 via holes 6 for the triggering by pressure of the ignition system 14 of the first stage for inflating the airbag 22 is transmitted at the same time via the flanges 122 and 126 to the exterior of the rotatable steering column 1 onto a system being axially movable but non-rotary with respect to the rotation movement of the column 1.

To the adjustment sleeve 9 within the carriage 3 providing steering column support there is connected the Bowden cable 12 via lug 128 fixed to sleeve 9 by which the axial positioning movement of this adjustment sleeve 9 is transmitted to the steering column adjustment or steering column comfort positioning generally designated as 33 via the link 10 unlocking the pin 120 and enabling the steering column 1 to move in a longitudinal direction axially and in vertical direction due to the pin 120 and slot 118. Normally, for comfort adjustment, unlocking of the pin 120 is effected manually by the lever 11 to allow axial positioning of the column 1 for the comfort of the driver, so that it can be set in any desired individual position. The positioning movement of the adjustment sleeve 9 in the carriage 3 providing the steering column support thereby leads by means of the Bowden cable 12 to the link 10 overriding the lever 11 and loosening pin 120 of the steering column adjustment 33 responsive to an accident. Therefore, the Bowden cable 12 disengages or unlocks the pin 120 by means of the release link 10.

Thus, by means of the primary ignition system 4, the adjustment sleeve 9 is shifted by the switching sleeve 8 that is rotatable together with the steering column 1. The adjustment sleeve 9 pulls the Bowden cable 12 which pivots the release link 10 leading to the release of the lock of pin 120 enabling movement axially of the steering column 1, and enabling adjustment in horizontal and vertical directions so that the column 1 can be retracted, that is, moved axially toward the floor of the vehicle and to the front so that it is withdrawn from the driver.

In an especially favorable way the stroke-like pressure during inflation of the airbag 18 is used for the retraction of the steering column 1, and thereby of the steering wheel (not shown) away from the driver. By means of the ignition of the first stage 14 and each further stage (merely as an example, only a second stage 20 is shown in the FIGS. 1A, 2A, 2B and 6 to which the invention is not restricted) the airbag 18 is immediately inflated and unfolds towards the driver. As a reaction to the inflation of the airbag 18, to be considered as an action, a pressure stroke away from the driver is also generated (a reaction). The pressure stroke away from the driver causes the steering column 1, released by the primary ignition system 4, as described above, to be moved downwardly or axially away from the driver. Hereby, the energy used for the inflation of the airbag 18 is used in an especially clever way at the same time for moving the steering wheel (not shown) away from the driver. Especially by means of this combination of several safety functions (the steering column 1 is moved by the pressure of the airbag), the construction of the steering column and associated parts is simplified and construction space, weight and costs are saved.

An absorbing element (not shown) in the steering column 1 may be used to avoid a larger airbag 18 when retracting the steering column 1. The element (not shown) is adjusted in such a way that a front-side shortening of the steering column 1 is achieved by telescoping a steering column hub (not shown). At the same time the airbag 18 pushes from the other side.

For the sake of the explanation of the arrangement of the airbag device 22 mention should be also made of the fact that in this first embodiment of safety means 101 according to FIG. 1A the ignition of the first gas generation stage 14 of the driver airbag 22 is constructed by means of the two pistons 15 with firing pins 130 cooperating with igniters 24a, 24b, mentioned above, as a double piston fuse which can be triggered by a pressure shock of the primary ignition system 4. Thereby, the double piston fuse that also includes two igniters 24a, 24b which are fired by firing pins 130 striking them and causing the gas generation of the material 132. The cord fuse 16 of the second gas generation stage 20 of this driver airbag 22 can comprise a known ring igniter on which a known double tearing action fuse engages at two sides.

In the following, in addition, special embodiment possibilities of the invention, for example, in the scope of the first embodiment example are stated.

Generally, the invention creates safety means for a motor vehicle with a steering wheel mounted on a steering column whereby the safety means includes pyrotechnically driven steering column retraction means.

According to a further development it can be provided that in such safety means, the steering column retraction means are constructed in such a way that when they are triggered, at first, it releases a steering column axial positioning mechanism, which can be performed especially by pyrotechnic operation means, and then, results in the retraction of the steering column along its axial positioning distance.

Alternatively or additionally, the steering column retraction means can be coupled to be driven by the operation means for an airbag, and especially a multi-stage triggerable airbag so that the same pyrotechnic operation means existing for the inflation of the airbag can be at least partly used for the release and/or drive of the steering column retraction means.

With this, it can be especially provided according to the device and method that the inflation and unfolding of the airbag, and especially, given the case, the multi-stage inflation and unfolding of the airbag in dependence with the retraction direction and/or the retraction position of the steering column can be dependently controlled. Or the device or the corresponding method can be designed in such a way that a mechanical control is provided initiating further mechanically triggerings of the pyrotechnic operation means for the steering column retraction means and/or the airbag in dependence on the retraction direction and/or the retraction position of the steering column and/or on the inflation/unfolding condition of the airbag.

A method for triggering and operating safety means in the scope of the invention can be characterized in that first by means of an ignition of a first propellant charge and/or a first stage of airbag devices or a one-stage airbag device, at least one adjustment of the steering column in its axial direction is released, and that the steering column is then treated, given the case, for igniting at least one second propellant charge in the direction of its maximum retracted position away from the driver.

In this method it is preferred that, given the case, the second propellant charge is ignited by the effect of the ignited first propellant charge.

Alternatively or additionally, it can be further provided in the method according to the invention that an airbag is inflated by means of the ignited second propellant charge simultaneously with, or time delayed to the steering column retraction.

Figure 2A:
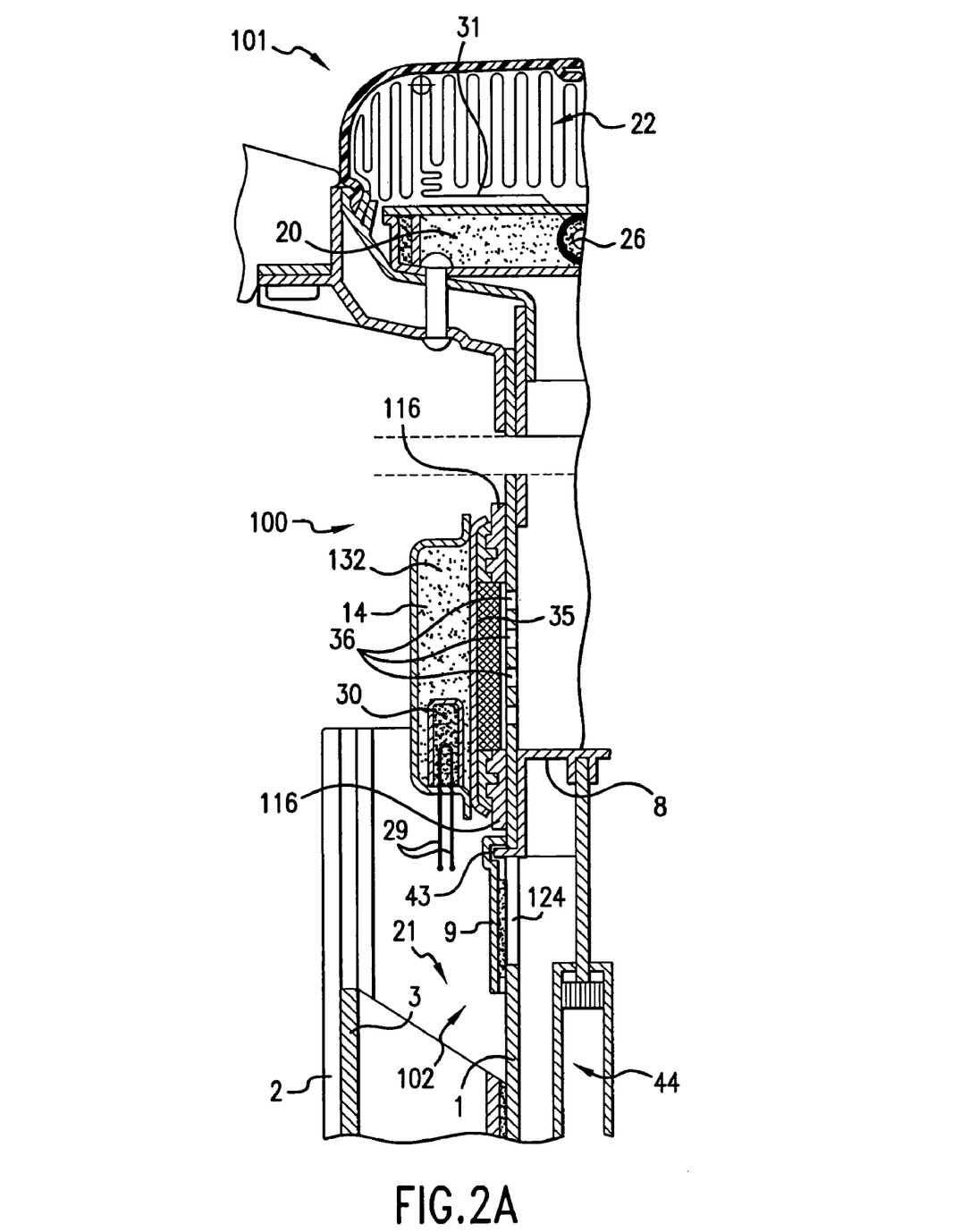
FIG. 2A shows in longitudinal cross section and schematically another embodiment of the inventive safety steering column with steering column retraction means (before activation) and a driver airbag mounted on the steering wheel at the head of the steering column.
Figure 2B:
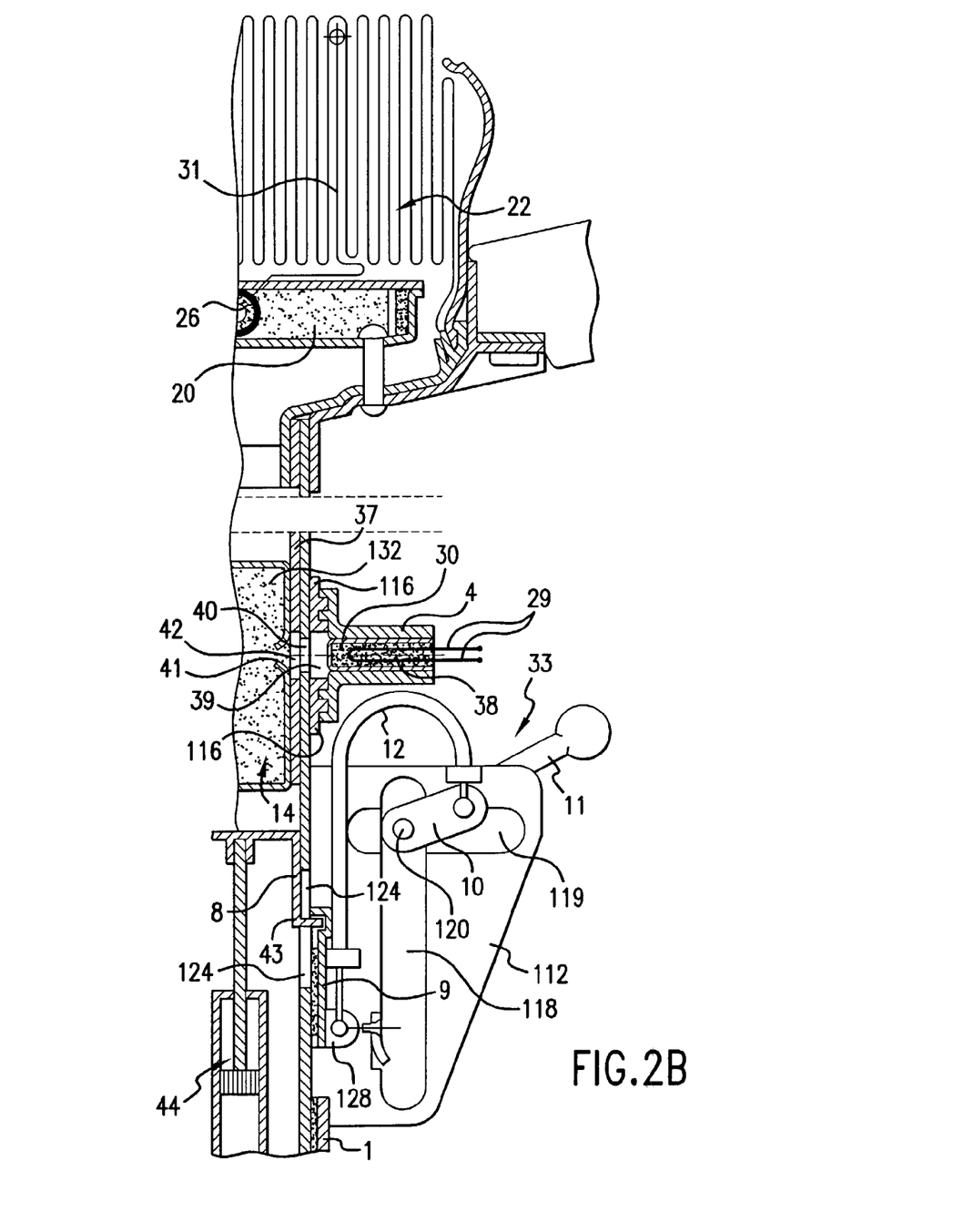
FIG. 2B shows in longitudinal cross section and schematically an alternative to the embodiment of FIG. 2A of the inventive safety steering column with steering column retraction means (after activation) and a driver airbag mounted on the steering wheel at the head of the steering column.

FIGS. 2A and 2B show two variations of the embodiment shown in FIGS. 1A and 1B. Essentially, FIGS. 2A and 2B show alternatives for mounting the first stage 14 of a two stage gas generation system in a safety steering column 100, according to the invention.

In the illustration of FIG. 2A, the safety means 101 of this embodiment are shown before a deployment of the airbag 22. In FIG. 2B an alternative for the first stage is shown after a deployment of the airbag 22. In both versions, there are two stages 14, 20 to the gas generation. The safety means 101 includes a two-stage gas generation airbag device 14, 20 of which the second stage 20 is only ignited if the airbag 22 was unable to unfold by means of the first gas generation stage 14 sufficiently that it is ensured that no further extension of the airbag 22 is required by the conditions of the crash. Like the arrangement described in conjunction with FIG. 1, this can be performed purely mechanically by means of cords or strings 31 which directly pull on an ignition mechanism 26 or which can release a tensioned ignition mechanism (not shown) by means of tension. The cord(s) can also serve or actuate electric switches or Hall generators or similar components, if an electric second ignition is used. The ignition of the second generator 20 applies full pressure only then to the airbag 22 if nobody is sitting too close in front of the airbag, or only then if the first stage has set the airbag 22 "in position".

FIG. 2A shows a gas generator 14 encircling the steering column 1 for the first stage. Gas generator 14 is carried or mounted on carriage 3 that is slidingly in engagement with support guide 2 fixed or articulated to the motor vehicle frame. The steering column 1 can turn or rotate, but the generator 14 remains still relative to the steering column 1. This has the advantage that the electric ignition applied via leads 29 and the cartridge 30 remain relatively stationary, and therefore, no costly coil spring for the current supply is necessary as already mentioned above. The carriage has mounted to it a plate 112 in the same manner as in FIG. 1A, (see FIG. 2B). Plate 112 is provided with right angle slots 118 and 119. Pin 120 held in a relatively fixed position is situated through both slots where they intersect, and can be locked in position or released responsive to manipulation of lever 11. At the same time, the sleeves 8 and 9 are provided in the same juxtaposition as in FIG. 1A. The gas generated in first stage 14 is passed through filter 35 and holes 36 formed in the wall or shell of the steering column 1 and the passage is sealed, for example, by labyrinth seals (not shown). The sleeves 8 and 9 coact in the same manner as described in conjunction with FIG. 1A in order to force lug 128 down and pull the Bowden cable 12 to cause the link 10 to unlock the pin 120 and enable the steering column to move axially. The gas pressure generated by the first stage 14 is applied to the sleeve 8 as described to effect the desired action. At the same time, the gas pressure is fed into the airbag 22 causing deployment. If insufficient deployment is achieved, the cord 31 triggers the second stage 20 for further inflation of airbag 22. The action and reaction is as described in conjunction with FIG. 1A. Also, present in the construction is a damper 44 to moderate the movement of sleeve 8. The coupling of sleeves 8 and 9 is slightly different in that sleeve 9 is provided with a U-shaped cap 43 to engage sleeve 8, and sleeve 9 is positioned below sleeve 8 instead on the same level.

The FIG. 2B shows an alternative arrangement wherein the first stage 14 is located within the steering column 1. The primary ignition stage 4 is mounted on the carriage 3 (not shown in this Figure as both the carriage 3 and the vehicle support 2 have been omitted for simplicity) and consists only of the leads 29 and the cartridge 30. The steering column defines a hole 40 in alignment with the cartridge 30. A tube 37 surrounds the first stage 14 and also has a hole 42 in alignment with the hole 40. When the cartridge is fired, the small charge generates gas pressure that blows a hole in the thin shell of the first stage 14 as indicated by reference numeral 41 and the hot gas ignites the material 132 of the first stage 14 producing the gas generation pressure to drive the sleeve 8 and to inflate the airbag 22. Thus, release of the comfort positioning via unlocking pin 120 occurs while at the same time the airbag 22 is deployed causing a reaction that pushes the steering wheel and steering column away from the driver. A dampener 44 attached to the underside of sleeve 8 is provided to moderate the movement of sleeves 8 and 9.

In front of and below the generator 14, sleeve 8 constitutes a piston mounted in the steering column 1 that interacts with sleeve 9 as noted to cause the Bowden cable 12 to pivot the link 10 and unlock the pin 120 to enable horizontal and vertical positioning of the steering column 1. The backstroke of the airbag 22, or the reaction force, drives the freed steering column 1 to the front and down with reference to the actual assembly in a motor vehicle (not shown). In order to prevent that a larger airbag 2 is required, the positioning speed can be slowed down by means of an absorber or dampener 44 as described, the function of which is well know in the art.

Amongst others the following advantages can be retrieved from the illustration of the embodiments described above:

Before the second stage 20 inflates the airbag 22 up to the final pressure, it is checked simultaneously manually and simply by means of the length of the cords 31 if nobody is sitting too close to the airbag.

The design of the generators 14 or 4 in FIGS. 2A and 2B as "stationary" means not rotating, and thereby results in a saving by not having to use a costly coil spring to compensate for the rotational movement of the steering wheel.

The pyrotechnic positioning of the steering column 1 according to the present invention provides more space between the driver and steering.

Figure 3:
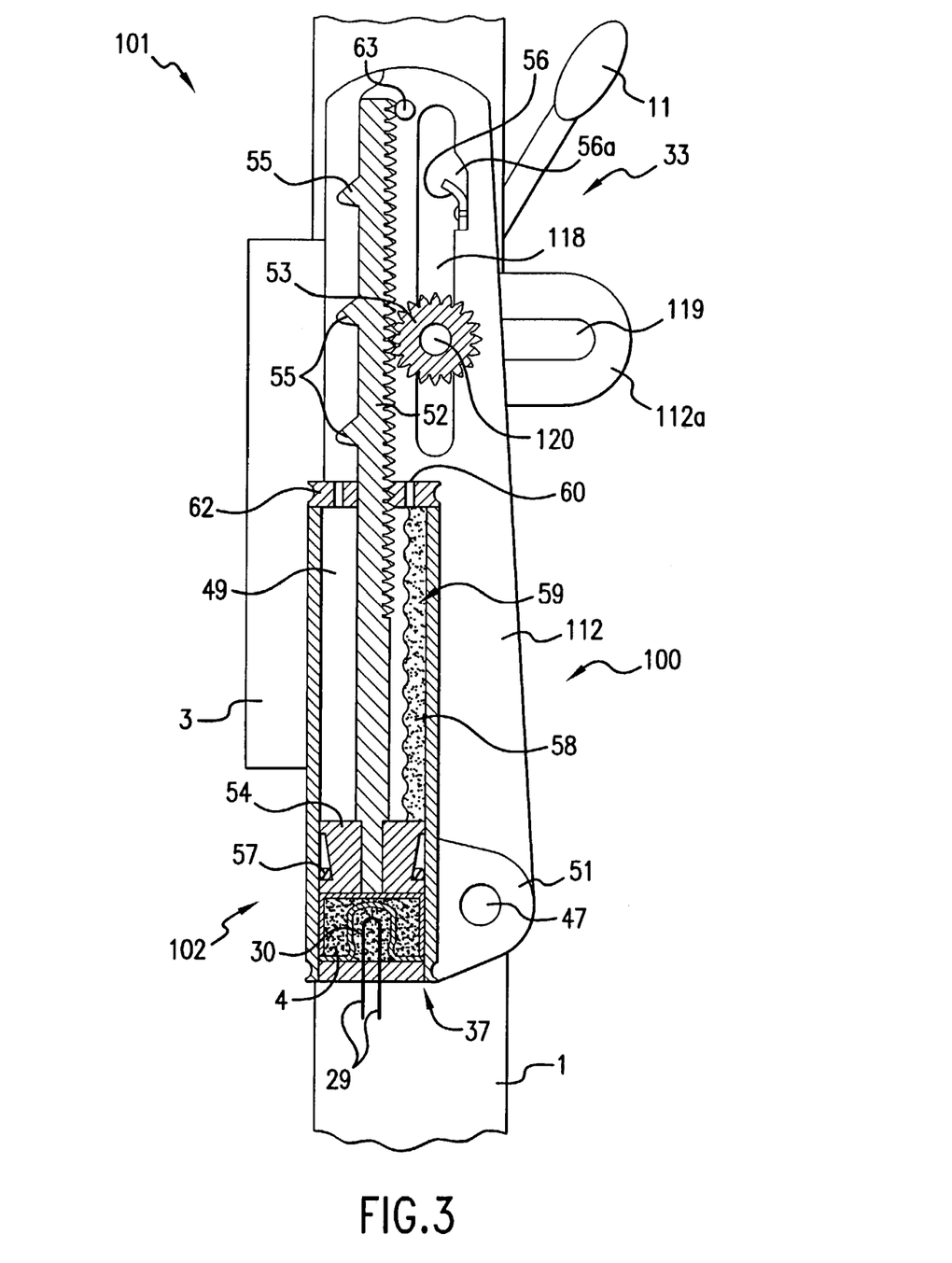
FIG. 3 shows in partial cross section and schematically another embodiment of a safety steering column with steering column retraction means.

With reference to the FIG. 3 a different embodiment of the invention is shown. As shown in the first two embodiments, this next embodiment is also based on the concept of creating more space between the driver and the steering wheel and, namely, by the following principles of the described embodiments.

A standard steering structure 33 providing adjustment because of comfort reasons (comprised of plates 112, 112a with vertical and horizontal slots 118, 119, lockable pin 120 and pinion 53) is connected in parallel generally to a pyrotechnically driven cylinder 49 via a lug 51 and an articulated or pivotal joint provided by a pivot pin 47. Before and during the deployment of the airbag 22 (not shown) in this Figure, actuation of the cylinder 49 opens the lock of the adjustable steering, freeing the steering column, and then, the gas reaction pulls the steering column 1 to the front in the alignment of the motor vehicle, that means away from the driver. The design, according to the invention, also provides an adjustable steering column which is pulled away from the passenger by means of a pyrotechnically driven cylinder in case of an accident.

According to a preferred refinement such a steering column can be provided with a pyrotechnically driven cylinder in such a way that it rotates a locking axis of the comfort positioning by means of a gear rod controlled by cams into engagement with a gear wheel, and thus opens the lock.

Alternatively or additionally, such a steering column can be provided with a pyrotechnically driven cylinder in such a manner that it rotates the lock axis of the comfort positioning by means of a swivel lever and thus opens the positioning lock.

In order not to affect the steering comfort positioning by the pyrotechnic cylinder provided according to the invention, furthermore, it is preferred to design the connection of the pyrotechnic cylinder in such a way that it slides in its normal condition (that means apart from an accident) in a slot guide in case of steering comfort positioning.

Furthermore, it can be preferably provided that a pyrotechnic positioning cylinder engages in the positioning mechanism of the comfort positioning in such a way that the piston rod designed as a gear rod engages in each comfort positioning after an equally short stroke in a positioning gear wheel (see, for example, FIG. 3).

Furthermore, it is preferred if the pyrotechnic positioning cylinder is movably mounted in a guide that it is moved in its initial position with the comfort positioning.

The pyrotechnic cylinder can also be mounted in its slot guide in such a way that in case of an ignition a keying of two wedges connected by shearing off pins keys in such a way that a wedge is keyed against the other one by taking the cylinder along and thus fixing the cylinder. Alternatively, it can be provided that the pyrotechnic cylinder is mounted in its slot guide in such a way that two wedge-shaped drivers can be keyed against each other, one wedge being moved in one direction by the piston, the other one being moved by means of a tearable driver in the opposite direction of the piston rod of the pyrotechnic piston.

A further preferred design of the present embodiment is that the pyrotechnic cylinder is constructed in such a way that after opening of the positioning mechanism, the carriage 3 with the steering column 1 is moved away from the driver. This can be further developed in that the pyrotechnic cylinder is guided in such a way that it is moved in the comfort carriage guide beyond the comfort way. Additionally, a pyrotechnic cylinder can be guided in such a way that the system locks at the end of the stroke. It is also possible that the pyrotechnic cylinder is provided with a lock piston, common in seat-belt tensioners, that the piston can only move to the front and locks in the case of load in the opposite direction. The latter can be further developed in such a way that the piston is constructed in such a way that load absorbers (not shown) can be used instead of lock balls.

Another design of the present embodiment examples is to fix an absorber (hydraulic or with air) at the pyrotechnic cylinder on the side opposite of the side on which the force acts in such a way that a speed regulation is generated by means of the discharging of media.

Furthermore, the pyrotechnic cylinder can be ignited in such a way that a coordination with the ignition of the airbag is performed.

Further possible designs and advantages result from the combination of the above and in the following mentioned features and the combinations thereof.

FIG. 3 shows a steering column 1 with comfort positioning 33 comprised of horizontal and vertical setting guide slots 118, 119, a pin 120 with a lock axis, a pinion 53 mounted on the pin 120 and a positioning lever 11 are illustrated. The positioning mechanism 33 is mounted to plates 112 and 112a which in turn are carried by the carriage 3 that is slidably mounted in support guide 2 that is part of the vehicle frame structure (not shown). The carriage and support plate 2 is described in detail in the preceding.

Cylinder 49 is connected in parallel to the positioning mechanism by means of a lug 51 that is connected to plate 112 in a swivel bearing 47. Within the cylinder 49 is a piston 54 having ball locks 57. Beneath the piston 54 is primary ignition stage 4 including cartridge 30 and firing wires 29 which are connected to a source of electricity as explained above. One end of a piston rod 52 is fixed in the piston 54 and extends upwardly through the cylinder 49 and projects out of the top cap or closure 62 of the cylinder 49. The top end of rod 52 is toothed to form a rack that meshes with pinion 53. Gear rod 52 has an equally close bearing position to gear wheel 53 irrelevant of the position in which the comfort positioning is. Cams 55 cooperating with cam guide structure (not shown) hold rack 52 in engagement with pinion 53. A position lock is provided by pin 63 which must be broken before rack 52 can move, but this occurs whenever the gas generated pressure in primary ignition stage 4 starts to move the piston 54. A bent pin lock 56 behind which is a recess 56a serves as a lock-up for the pin 120 whenever the steering column is unlocked and the reaction force drives the steering column to the front; at the same time the pin 120 is driven to the top of the slot 118 and trapped behind the bent pin 56 in recess 56a. The cylinder 49 contains viscous media 59 that is moved upwardly driven by the upward movement of the piston 54. This serves to moderate the upward movement. At the same time, when the media is trapped in the narrowing space above the piston 54, it will be able to be extruded out of the cylinder 49 through holes 60 in the top cap 62, providing a restrictive orifice to further moderate the upward movement of the piston 54. A needle valve can be situated in one or more of the holes 60 to further moderate flow of media and also to enable control of the flow of media by setting the opening of the needle valve, as will be apparent to those of skill in the art.

The pyrotechnic cartridge 30 of primary ignition stage 4 is ignited by a computer (not shown) before or simultaneously with the airbag 22 deployment (not shown). The optimum ignition time can be readily determined for particular situations.

An alternative is given by the ignition in the case in which monitoring electronics detect that, for example, a small person is sitting too close in front of the steering wheel.

The pyrotechnic energy drives the gear rod 52 by means of a piston 54. The gear rod 52, forcibly guided by cams 55, meshes with the gear wheel or pinion 53 which, when rotated will unlock the steering column positioning 33 by means of the lock pin 120. After unlocking the steering column 1 (approximately after a quarter rotation of the lock pin 120), the cylinder 49, by reaction to the gas generation, will push the plate 112 toward the front forcing carriage 3 to move the steering column 1 to the front, down as viewed in FIG. 3.

Normally, the column 100 is pushed further to the front than the comfort positioning allows. Hereby, the positioning axis of pin 120 locks behind a comfort way restriction 56.

If, because of accident relevant reasons, the steering 100 cannot cover the total distance to the front, an intermediate lock of the piston 54 with lock balls 57 is given preventing reverse movement of the piston 54.

If trials should prove that the positioning speed of the steering 100 has to be slowed down from a certain distance in concrete operation conditions and/or cases (for example, in order to optimize the cooperation of airbag deployment and retraction of the steering column), this can be performed by means of an air or hydraulic brake comprised of media 59. On the side opposite of the pyrotechnic side, the medium 59 is stored and pushed in a calculatedly slowed down manner by jet bores 60 of the cylinder cover 62. Normally, these holes 60 are sealed by a fracturable or tearable covering that can be easily disrupted by the force of the media 59.

In the normal repose condition the gear rod 52 is also held in position by means of a position lock 63. The movement guidance of the gear rod 52 by means of the cams 55 breaks this position lock in case of an accident. After the accident, the steering column 100 can be made functional again, for example, by replacing the cylinder 49 and the position lock 63, if the remaining steering 100 allows this.

Of course, the gear wheel 53 and the gear rod 52 can be replaced by a lever system with adapted setting for the comfort positioning (not shown).

Figure 4:
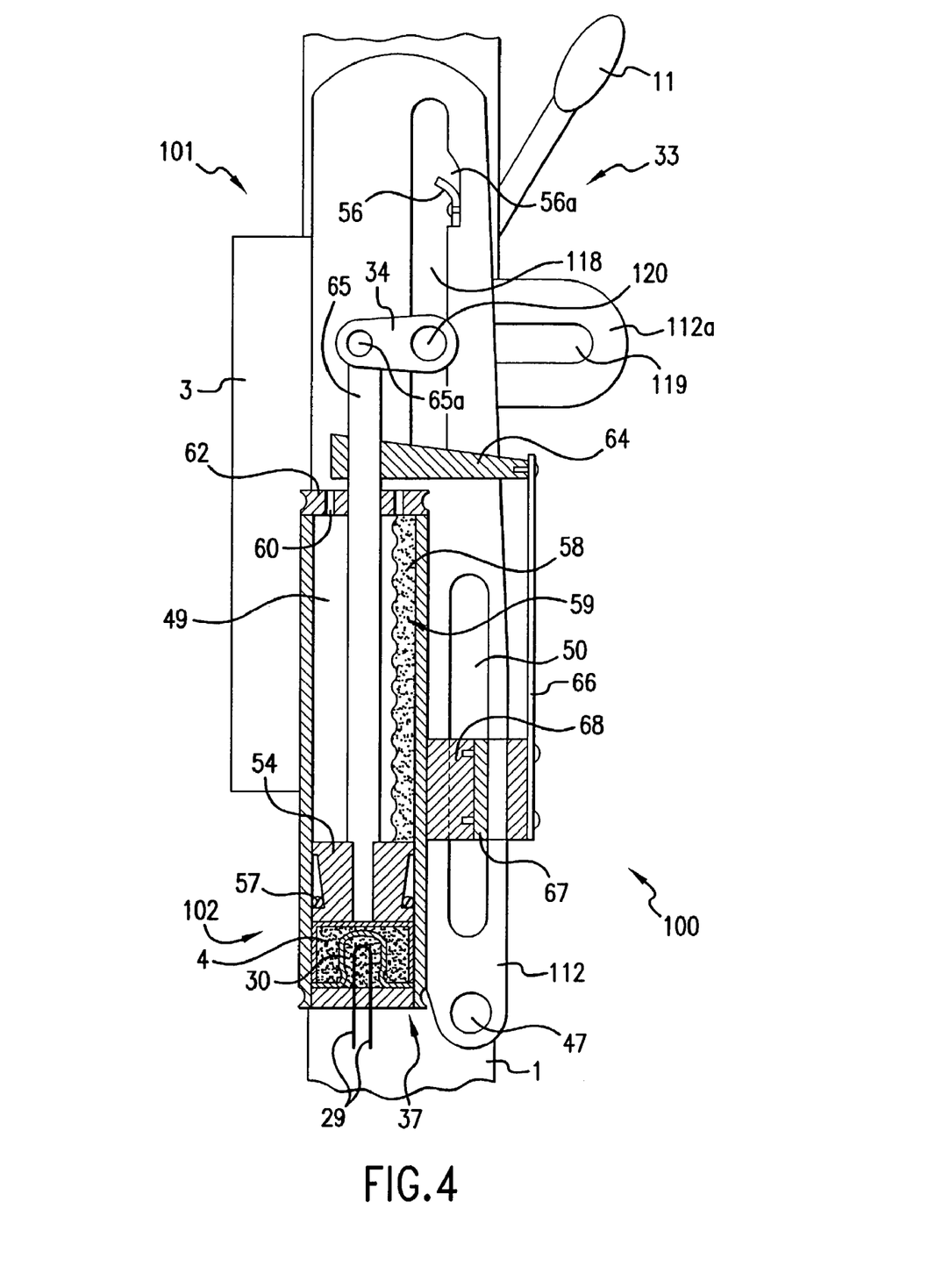
FIG. 4 shows in partial cross section and schematically another embodiment of a safety steering column with steering column retraction means.

The FIG. 4 shows as a variation of FIG. 3 in which piston rod 65 is anchored at its lower end in the piston 54 and its upper end projects out of the cylinder 49 through top cap 62. At the top end of the rod 65 is a crank 34 that is pivoted to the rod 65 via pin 65a and is coupled to the pin 120 that serves to lock the comfort positioning 33. Lever 11 normally locks and unlocks the pin 120, as described previously. When the primary ignition stage 4 is fired, the rod 65 will be moved upwardly releasing the pin 120 lock and allowing the reaction force to move the steering column 1 to the front as already explained. A driver 64 on the piston rod 65 via a tearable connection 66, keys a slidingly guided wedge 67, in slot 50, against a wedge 68 fixed to the cylinder 49. Thus, the cylinder 49 is fixed during an accident in each position determined by the comfort positioning.

In FIGS. 3 and 4 the carriage 3 and the support structure 2 have been omitted for simplicity. However, it should be understood, that the carriage 3, slidably mounted in structure 2, supports the steering column 1 in order to enable the steering column 1 to move axially when it is freed from the locking of pin 120. At that time, the cylinder 49, since it is mounted pivotally to plate 112 will also move axially with the steering column 1.

Other similar solutions are within the scope of the knowledge of someone skilled in the art from the teachings herein. In summary, FIGS. 3 and 4 show examples of a safety steering according to the invention with a pyrotechnically activatable cylinder which unlocks an adjustable steering column during an accident, and pulls it away from the driver. Thus, a larger distance between the driver and the deploying airbag 22 and the steering wheel is generated. Both reduce the risk of the driver being injured.

Figures 5A, 5B, 5C:
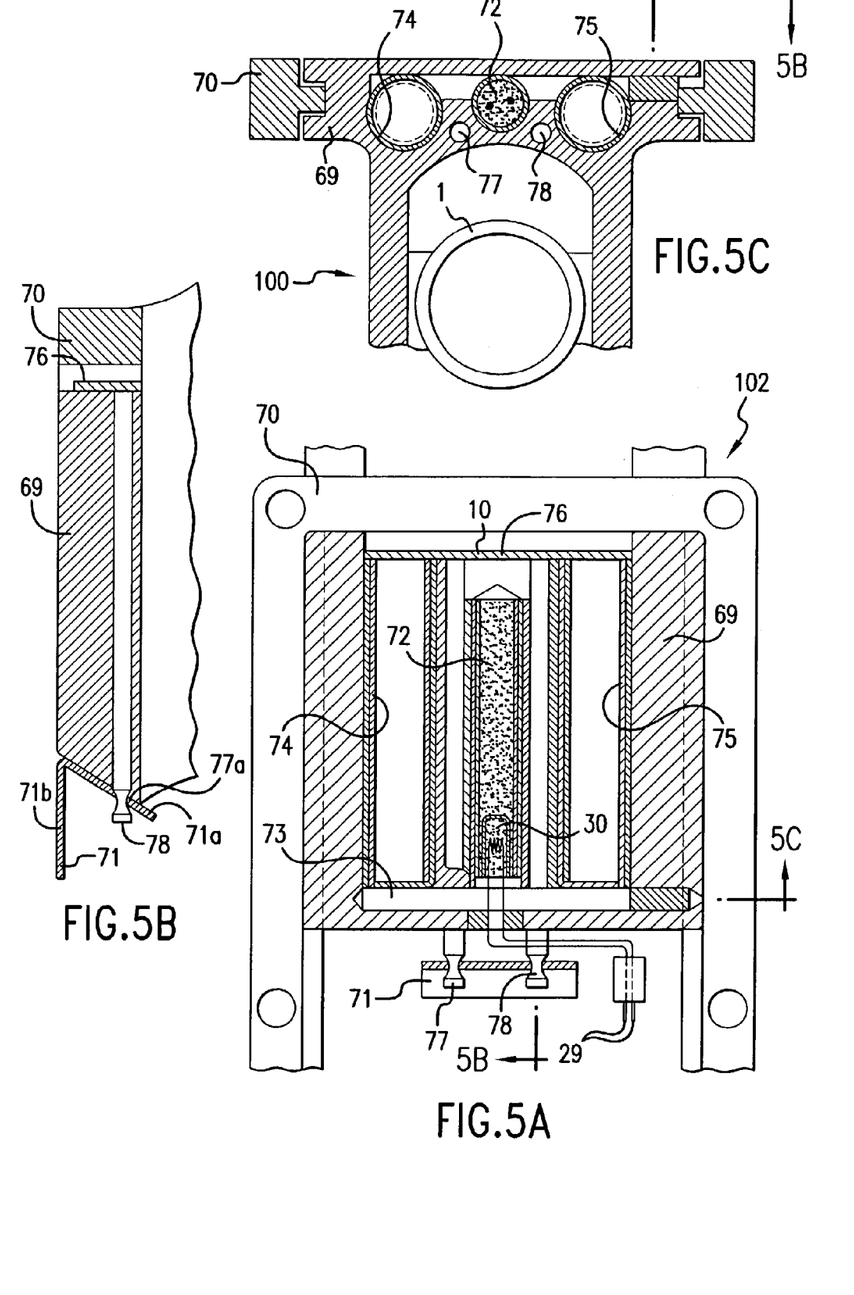
FIGS. 5A, 5B and 5C show in partial cross section and schematically parts of another embodiment of a safety steering column with steering column retraction means.

In the FIGS. 5A, 5B and 5C a further embodiment of a safety means for a motor vehicle with a steering wheel, and especially a pyrotechnically adjustable steering column, mounting is explained. Thus, a further increase of the safety of, for example, motor vehicle passengers, is achieved in the way that the safety means include pyrotechnically controlled steering column retraction means. Thereby, the steering wheel can be moved away from the driver whereby his risk of being injured by the impact on the steering wheel is extremely reduced.

This embodiment according to the FIGS. 5A, 5B and 5C deals specifically with the difference between a large person as the driver and a small person as the driver. FIG. 5C is a transverse section through the steering column 1 showing the carriage 69 sliding in the frame 70. As one is viewing the steering column 1 dead-on in FIG. 5C, the steering wheel (not shown) lies below the sheet of drawing. FIG. 5A is a view at right angles to FIG. 5C, as will be evident from the section line of FIG. 5C taken along line 5C in FIG. 5A. Likewise, FIG. 5B is at right angles to FIG. 5A as will be evident from the section line 5B in FIG. 5A. The structure shown does not include an airbag, which may incidentally be added as a separate component. The structure consists of a carriage 69 to which is mounted the steering column 1. The carriage is arranged to slide in a frame 70 that is fixed to the vehicle frame and, at the same time, the carriage is coupled to a load absorber 71, in a known and conventional arrangement. The load absorber 71 is a sheet metal part the top end 71a of which is bent at an acute angle to the portion 71b that is fastened to the vehicle body. Pins 77 and 78, mounted in the carriage protrude from the bottom of the carriage 69 and are received in holes 77a in the top 71a of the sheet metal part 71. This provides the coupling between the sheet metal part 71 and the carriage 69.

When a sufficient load is imposed, such as the impact of a person against the steering wheel (not shown) mounted at the top of the steering column 1, due to a vehicle front end crash, this causes the carriage 69 to try to move to the front, and thereby, using pins 77 and 78 tear or destruct the coupling with the sheet metal 71 resulting in an absorption of energy of the impact or vehicle crash. The carriage 69, freed from the sheet metal 71 can now move downward toward the front of the vehicle carrying the steering wheel and steering column 1 with it.

A problem arises, however, when a small person is sitting in the driver's seat. A small person cannot generate a sufficient load or force to cause the coupling between the carriage and sheet metal part to tear or destruct allowing the carriage, steering column and steering wheel to move. Therefore, the steering wheel remains stationary on impact, and the small person can be severely injured, as he/she will have to absorb all the crash energy.

The present invention provides a solution to this problem. As shown and described with reference to FIGS. 5A, 5B and 5C. In this embodiment of the invention, the construction comprises a carriage 69 on which steering column 1 is mounted movably mounted in a frame 70 which is fixed on the vehicle body (not shown). The carriage 69 is slidable in frame 70 in a longitudinally movable manner. As explained, if the driver is a large or big person, and she/he hits the steering wheel (not shown) due to a frontal crash, a deformable and tearable load absorbing sheet 71 will absorb the load peaks. However, in the case of the driver being a small person, the problem mentioned above arises. In such case, the novel structure of the invention provides a pyrotechnic cartridge 72 that contains an igniter 30 ignited by electrical signals via lines 29, as previously explained. Monitoring electronics generate a signal that the driver is a small person, and therefore, upon a frontal vehicle crash being experienced, a signal is generated, indicative of the fact that the driver is sitting close in front of the steering wheel. The signal is fed to lines 29 to ignite igniter 30 and fire off the pyrotechnic cartridge 72 to generate gas pressure. The gas pressure will travel via a pressure distribution channel 73 to the end faces of pistons 74 and 75 driving them upward as seen in FIG. 5C (rearward in the vehicle). These pistons 74 and 75 press on a transverse sheet 76 that is fixed to the top ends of the two lock pins 77 and 78, which at their opposite ends are coupled to the load absorbing sheet 71. By this action, movement of sheet 76 upward (see FIG. 5C) forcibly pulls these lock pins 77 and 78 out of the holes 77a of the load absorbing sheet 71, and retracts them into the carriage. At this time and under the conditions noted, when a small person strikes the steering wheel, steering column 1 and the carriage 69, the carriage 69 now does not have to tear or destruct the load absorber 71. With the pins retracted in the carriage 69, the bottom of the carriage, which is inclined, can easily push past the load absorber 71, because top end 71a is bent at the same acute angle, and therefore easily pushed back against part 71b to allow the carriage 69 to pass, enabling the steering wheel to move away from the small driver.

It is well-known from the practice that today's steering columns are optimized for an accident situation and can be constructed in such a way that they are mounted on a carriage which moves against a load absorber to absorb a degree of the energy of impact when a person hits the steering wheel. This load absorber is, for example, deformable or deforming and a tearing sheet which is connected to the carriage on the one hand and connected to the mounting of the steering at the body on the other hand. In case of an accident, the driver impacting on the steering wheel produces a movement of the steering wheel that is performed additionally to the airbag deployment, thereby providing two sources for absorbing energy. This reduction or division of the load peak between the movement of the steering wheel and the deployment of the airbag is especially of advantageous as a double safety means in the case of heavy persons.

Small drivers are forced to sit close in front of the steering wheel. Due to this relatively little, for some accident situations, too little distance to the airbag, deaths may occur even though such persons have fastened their seat-belts.

As noted in this embodiment of the present invention, the novel structure is provided such that the carriage 69 is coupled with a load absorber which absorbs energy in the case of a heavy or large driver striking the steering wheel due to an accident. This divides the energy absorption between the steering wheel and the airbag that deploys when or just after the driver strikes the steering wheel. However, in case of an accident involving a small or light driver sitting close to the steering wheel, this fact is sensed, and the steering wheel is able to be moved a preselected distance away from the driver to the front by the driver striking the steering wheel, before or during the deployment of the driver airbag (that means in the usual driving direction), since at the same time the load absorber has been decoupled. Hereby, the distance of a small person's head to the airbag is increased by the necessary distance required for a injury-free deployment of the airbag, which will absorb remainder of the crash energy imposed on the small driver, there being a division of energy absorption in this case.

In this embodiment of the present invention, by means of electric switches mounted in the driver seat, it is sensed whether the driver is positioned in the front area of the sitting positions. Responsive thereto, a pyrotechnic cartridge 72, which is positioned inside or on the carriage 69, is conditioned for triggering in the event of a crash. When a crash or accident occurs, the pyrotechnic cartridge 72 is triggered before or during the deployment of the airbag by means of the airbag crash electronics. The gas pressure generated by the cartridge 72 is passed via a channel 73 onto pistons 74, 75, which at first unlock and retract the pins 77, 78 and uncouple the carriage 69 from its fixing to a load absorbing sheet 71, and then allows or enables the carriage 69 together with the steering column 1 to move in the driving direction for a distance in dependence on the force of impact of the small person on the steering wheel.

Figure 6:
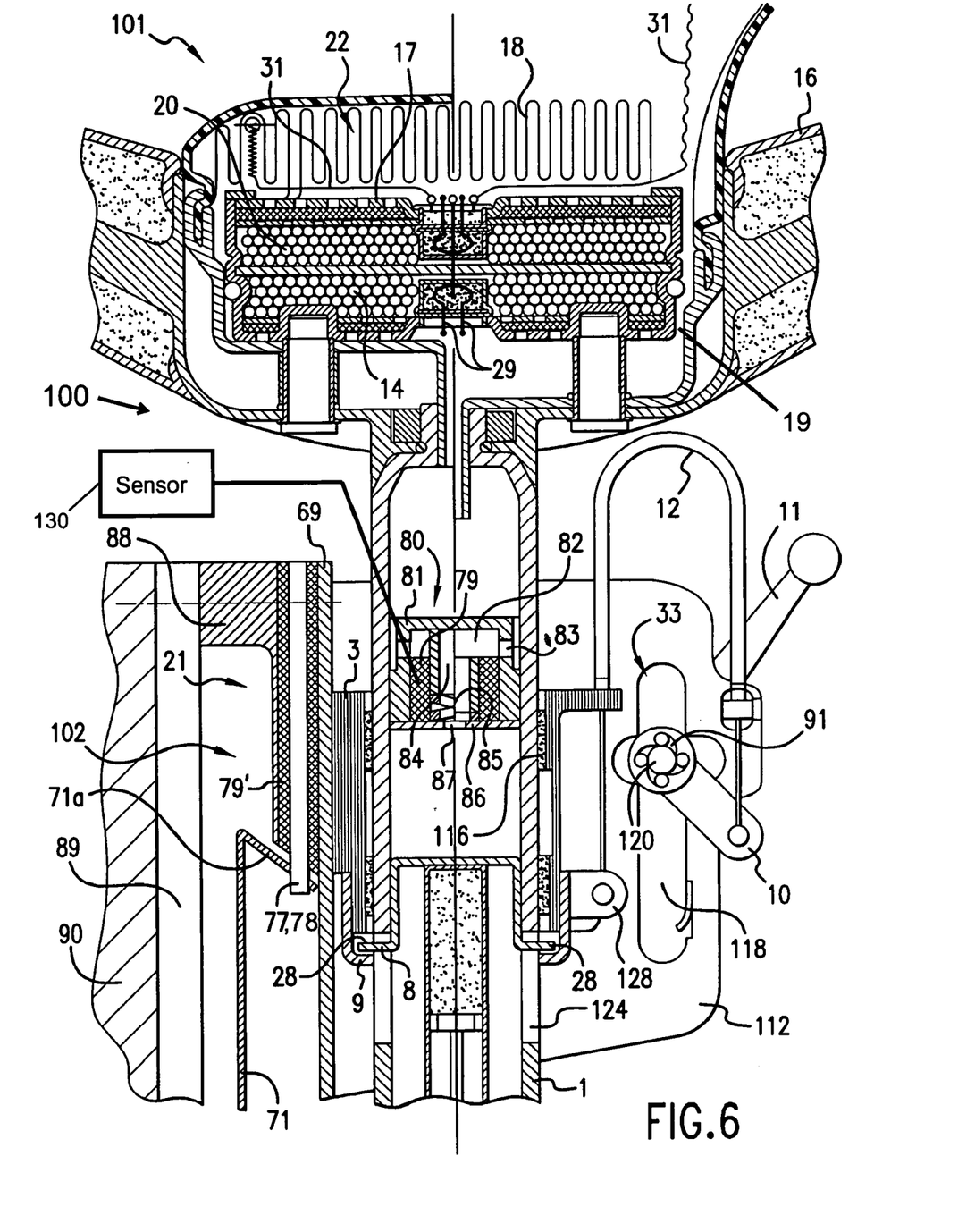
FIG. 6 shows in partial cross section and schematically another embodiment of a safety steering column with steering column retraction means and a driver airbag mounted on the steering wheel at the head of the steering column.

Basically, this embodiment is an example based on the idea that a mounting of the steering column to the carriage which absorbs load peaks by means of a movement against an energy absorbing sheet in case of a driver's impact on the steering wheel, is used differently for large and small people. After detecting a small person by means of the monitoring electronics, the load absorbing sheet is unlocked and decoupled from the longitudinally movable carriage by means of the mechanism according to the invention of using pyrotechnic technology A further embodiment of the safety means according to the invention for a motor vehicle with a steering wheel on a steering column is shown in the FIG. 6. In this embodiment, the structure is such that different functioning is established for three categories or sets of conditions, namely, the driver is (1) a large person, (2) a small (medium) person, like a small man, and (3) a very small person, like a small woman. For simplicity, the categories will be referred to as large, medium and small. As shown in FIG. 6 a steering wheel 16 is conventionally mounted on a steering column 1. The steering wheel contains or houses a two stage airbag system 22 with a primary gas generator 14 and a secondary gas generator 20, both of which have ignition cartridges. The primary gas generator is fired electronically via wires 29 responsive to a crash. The secondary gas generator is fired by cords 31 as explained previously, as the need arises. The gas generated from the primary gas generator goes to inflate the airbag and, at the same time, goes into the steering column and enters a magnetic valve 80 with a casing 81 which lets gas flow in its interior 82 through openings 83. An electric signal, for example, based on the driver's sitting position and the seat-belt situation, is used to condition a pipe 84 to "gas passage" or "no gas passage" by means of activation of a magnetic coil 79. The pipe 84 is held "closed" i.e. "no gas passage" in its repose position by means of a spring 85. The bottom plate 86 of the casing 81 seals the magnetic valve in the steering column 1. A hole 87 in plate 86 allows for gas passage into the lower part of the steering column 1, whenever the pipe 84 is in the "open" or "gas passage" condition.

Gas entering the lower part of steering column 1 exerts force on the inverted sleeve 8 which coacts with the sleeve 9 in the manner already described previously. The effect is to unlock the comfort positioning via the Bowden cable 12, which unlocks the pin 120 and allows the steering column 1 to move axially. In this embodiment, the pin 120 is provided with a free running ball bearing assembly 91 to facilitate movement. Also, as shown in FIG. 6, carriage 3 is mounted to the steering column 1 to allow rotation via pads 116 but not relative axial movement; the carriage 3 and steering column 1 move axially together when the comfort positioning is released or unlocked, as previously described. Carriage 3 is fixed to carriage 69, which has a projection 88 that rides or is guided in slot 89 of stationary frame 90 fixed to the vehicle frame. Carriages 3 and 69 move together. Carriage 69 contains the pins 77, 78 which are surrounded by coil 79' that can be activated to cause the pins 77, 78 to retract and unlock from the bent top end 71a of the load absorber metal plate or sheet 71 that is otherwise fixed to the vehicle frame as mentioned in conjunction with FIGS. 5A, 5B and 5C.

The electronic controls that are required to make the structure function in the manner described will be apparent to those of ordinary skill in the art from the disclosure herein. The embodiment of FIG. 6 is conditioned as follows for a large person. When a crash occurs and the driver is a large person, that fact has already been sensed by the driver sifting position and seat belt condition, and other sensors that are deemed desirable to this end. When the primary gas generator 14 is fired off, and gas enters the steering column 1, the magnetic valve is conditioned for "no gas passage", i.e. held closed. The pins 77, 78 are extended as shown in FIG. 6. The large person strikes or hits the steering wheel 16 and the force is absorbed by the coaction of the carriage and the load absorber plate or sheet 71. When a crash occurs and the driver is a small man (medium size person), the magnetic valve 80 is conditioned for "no gas passage", i.e. held closed. The coil 79' is activated and the pins 77, 78 are now retracted to within the carriage 69. The medium person strikes or hits the steering wheel 16 and the force is absorbed mainly by the coaction of the carriage and the load absorber plate or sheet 71, but the absorption is much less than in the case of the large person, because the carriage 69 can move more easily past the top bent end 71a of the bent metal sheet absorber 71, by bending it back against itself as explained in conjunction with FIGS. 5A, 5B and 5C. Finally, when a crash occurs and the driver is a small woman, this fact is sensed and the magnetic valve 80 is conditioned for "gas passage" by activation of coil 79, and gas passes into the lower steering column moving the sleeve 8 against sleeve 9 and causing the Bowden cable 12 to release or unlock the pin 120 for free running whereby the carriage 69 carrying the carriage 3 and the steering column 1 can move axially. Due to the reaction of the gas generation and deployment of the airbag 22, the steering wheel 1 and coupled components will move to the front and away from the small woman.

In this embodiment, the pressure of the airbag can be used to unlock the comfort positioning by means of pistons as shown in the embodiments mentioned above. Also, the pressure gas can also be controlled, for example; by a magnetic valve in such a way that it can or cannot pass through to the steering column positioning. Such a magnetic valve is preferably mounted in the steering column tube between the airbag pressure supply and the pistons.

The background of this measure is the fact that it is of advantage for heavy, tall people who are sitting in the right position, if the steering remains in its normal position in order to be able to absorb energy additionally to the airbag. In the case of small people fitting close to the steering wheel and the airbag it is better, however, to have a larger distance to the airbag. Here the airbag alone is sufficient to absorb the energy. There is an intermediate situation, for a person in between a large person and a very small person, and in this circumstance, some absorption takes place by slight interaction with a deactivated load absorber in combination with the airbag.

The detection of a small person can be performed by means of ultrasonic or infrared sensors (shown schematically as sensor 130), seat occupancy detection mats or querying of the seat positioning or seat memory electronics.

The easiest and mostly cost effective device is a switch in the seat runner which queries the position and correctly detects small people in the case of front driver seat positionings. If then a small person is driving, in this way, basically, the magnetic valve can be switched to the gas passage, and thereby to pass gas in order to open the comfort positioning.

A further possibility is the detection usually by a switch in the belt catch if the (small) (possibly also tall) person is wearing or is not wearing a seat-belt. According to this the steering wheel positioning away from the head can be controlled especially for a small person not wearing a seat-belt. A further completion of the embodiment is the use of a "free running" between the twist off axis of the steering positioning and of the lever 10 which opens the positioning, in case of an accident.

Modern safety columns are usually mounted in a carriage-like casing which, in its turn is guided in a frame which is fastened together with the body. The carriage-like casing is connected with the frame by means of a metal sheet load absorber 71. In case of an accident this sheet is deformed by absorbing energy if a tall, heavy passenger transmits great forces to the steering system, as already mentioned above, As this energy is necessary especially for tall, heavy people, the crash carriage can be better used in the case of small people possibly not wearing a seat-belt as described above.

A further possibility of moving the steering in case of an accident is, additionally or alternatively to the crash carriage and alternatively to the positioning, by means of a piston in the steering column 1. There is the possibility of opening the comfort positioning of the steering if necessary by means of a pyrotechnically driven cylinder as described previously.

In the embodiment as shown in FIG. 6, a two-stage airbag device 22 is used which positions the steering 100 if necessary, independently opens the airbag lid by means of a pressure vessel and then detects by means of the softly inflated bag with several sewed threads or strings 31, whether the driver is or is not "out of position" in the danger zone of the bag 22. If all threads 31 reach their full length and tear off, thus the second stronger stage 20 of the bag 22 will be triggered.

In the scope of the sixth embodiment, in summary by means of sitting position detection and/or fasten seat-belt detection, it can be decide or predetermined for the steering, long before an accident, if 1. the crash carriage is used for absorbing energy or as a moving carriage for a larger distance between head and bag, 2. the comfort longitudinal and/or vertical positioning is or is not opened in dependence of, for example, the person's weight or his seat-belt condition, 3. the airbag pressure opens the comfort positioning of the steering, and then, for example, by a pressure vessel, opens the airbag cover in any case so that the bag can softly come out.

Then the second stage of the airbag device can be triggered by the airbag, control device or alternatively by the same signal just like the first stage. This especially makes sense in the case of tall, heavy people who wear a seat-belt. In the case of small people not wearing a seat-belt, the bag of the first stage softly comes out and detects by means of attached threads if the bag can fully deploy all over. Only then, if nobody is in its way, the second stage will be trigged.

In this way the following advantages result.

By means of a simple sitting position and/or fastened seat-belt detection it is basically decided in each new trip before an accident whether the steering is brought to a larger distance or not and whether the airbag device has to find out at first if the second, safer but more aggressive stage may be trigged or not, For example, it can also be provided that the bag does not need to open its cover itself but can come out softly. By these measures the risks of the system can be reduced in half Furthermore, by means of the various forms of this invention, individual measures for small people, people not wearing seat-belts, people "out of position" and infants seats are taken to reduce the aggressiveness of the driver airbag. The measures are taken before and partly simultaneously to an accident. In comparison to other "electronic" solutions, the principles, system and embodiments recommended in the scope of the invention are faster and by far more cost effective. Further, by means of the steering column positioning and in particular the adaptable and controllable steering column positioning, the problems of the "fatal" airbag are solved at the root.

The invention is solely illustrated by the embodiment examples in the description and in the illustration by the way of examples and is not restricted but encompasses all variations, modifications and substitutions that the ordinary person skilled in the art can especially derive from the scope of the claims and the general explanation in the introduction of this specification, as well as, the description of the embodiments and their illustrations in the figures. In particular, all individual properties and potential configurations of the invention and their embodiment can be combined with each other.

What is claimed is:

1. In a safety steering system for a motor vehicle including a carriage coupled to a steering column in non-rotary fashion for adjustment of the steering column in its axial direction and a load absorber coupled to the carriage and fixed to the vehicle whereby the steering column can move axially responsive to a vehicle crash and a driver striking the steering column the improvement comprising a sensor to sense driver data, a mechanism mounted on the carriage for initiating decoupling of the carriage from the load absorber to enable the steering column to move axially more easily away from the driver in case of a crash, and a control for the mechanism that is conditioned by the sensed driver data for activating the mechanism responsive to predetermined driver data.

2. In a safety steering system for a motor vehicle according to claim 1 further including an airbag system including a gas generator mounted on the steering column.

3. In a safety steering system for a motor vehicle according to claim 2 further including a comfort positioning means for setting the steering column in a preselected axial position, a second mechanism for releasing the comfort positioning means responsive to gas pressure generated in the airbag system, and a second control for controlling the gas pressure presented to the second mechanism.

4. In a safety steering system for a motor vehicle according to claim 3 wherein the second control is a magnetically controlled valve.

5. In a safety steering system for a motor vehicle according to claim 2 wherein the first-mentioned control is an electric coil.

6. A safety method for a motor vehicle in the event of a vehicle crash and in which vehicle a steering column is set in a preselected axial position, but releasable for axially movement away from the driver, and a load absorber is connected to the steering column, comprising the steps of sensing driver data, and responsive to a vehicle crash and in dependence on the sensed driver data, and controlling the connection between the load absorber and the steering column, such that for a first set of sensed driver data the connection to the load absorber is maintained and the steering column is not released, for a second set of sensed driver data the load absorber is disconnected and the steering column is not released, and for a third set of sensed driver data the load absorber is disconnected, and the steering column is released for axial movement away from the driver.

7. A safety method for a motor vehicle in the event of a vehicle crash according to claim 6 wherein the motor vehicle further includes an airbag mounted on the steering column, comprising the further step of deploying the airbag in dependence on the sensed driver data.

* * * * *